(12) United States Patent
Frank

(10) Patent No.: US 9,003,891 B2
(45) Date of Patent: Apr. 14, 2015

(54) METHOD AND FASTENING DEVICE FOR FASTENING AN ASSEMBLY IN AN OPENING OF A WALL OF A VEHICLE

(75) Inventor: Karl-Christian Frank, Tegernheim (DE)

(73) Assignee: Continental Automotive GmbH, Hannover (DE)

( * ) Notice: Subject to any disclaimer, the term of this patent is extended or adjusted under 35 U.S.C. 154(b) by 284 days.

(21) Appl. No.: 13/695,313

(22) PCT Filed: Apr. 15, 2011

(86) PCT No.: PCT/DE2011/000417
§ 371 (c)(1),
(2), (4) Date: Nov. 21, 2012

(87) PCT Pub. No.: WO2011/134453
PCT Pub. Date: Nov. 3, 2011

(65) Prior Publication Data
US 2013/0055822 A1    Mar. 7, 2013

(30) Foreign Application Priority Data

Apr. 30, 2010    (DE) .......................... 10 2010 019 093
May 19, 2010    (DE) .......................... 10 2010 020 961

(51) Int. Cl.
*G01L 7/00*     (2006.01)
*F16B 21/04*    (2006.01)
(Continued)

(52) U.S. Cl.
CPC ....... *G01D 11/30* (2013.01); *B60R 2021/01006* (2013.01); *F16B 21/02* (2013.01)

(58) Field of Classification Search
None
See application file for complete search history.

(56) References Cited

U.S. PATENT DOCUMENTS 1,860,715 A    5/1930    Kellog
5,067,750 A    11/1991   Minneman
(Continued)

FOREIGN PATENT DOCUMENTS

DE    43 31 795    3/1995
DE    195 28 474   2/1997
(Continued)

OTHER PUBLICATIONS

International Search Report of the International Searching Authority for International Application PCT/DE2011/000417, mailed Oct. 12, 2011, 2 pages, European Patent Office, HV Rijswijk, Netherlands.
(Continued)

*Primary Examiner* — Andre Allen
(74) *Attorney, Agent, or Firm* — W. F. Fasse

(57) ABSTRACT

A fastening device includes a support element placed on a vehicle wall, a retaining element having a retaining wing for fastening the device in an opening of the wall, and a sealing element between the support and retaining elements. The retaining element is rotatable relative to the support element along a rotation path, e.g. by a bayonet-type movement. The support element, the retaining element and/or the sealing element are designed such that a play remains between the support element, the retaining element and/or the sealing element in a first section of the rotation path, and such that the support element and/or the retaining element move(s) relative to the sealing element so as to eliminate the play at the end of the rotation path, whereby the sealing element is sealingly compressed between the support element and the retaining element, thus sealing the fastening device.

11 Claims, 5 Drawing Sheets

(51) Int. Cl.
  *G01D 11/30* (2006.01)
  *B60R 21/01* (2006.01)
  *F16B 21/02* (2006.01)

(56) References Cited

U.S. PATENT DOCUMENTS

| | | | |
|---|---|---|---|
| 5,368,427 | A | 11/1994 | Pfaffinger |
| 6,179,273 | B1 | 1/2001 | Edmunds et al. |
| 6,647,793 | B2 | 11/2003 | Dirmeyer et al. |
| 6,755,601 | B2 | 6/2004 | Ohta |
| 6,837,645 | B2 | 1/2005 | Kanatani et al. |
| 7,618,211 | B2 | 11/2009 | Wood |
| 7,661,215 | B2 | 2/2010 | Okamoto |
| 2008/0056816 | A1 | 3/2008 | Sussenbach |
| 2009/0116901 | A1 | 5/2009 | Bohman et al. |
| 2009/0263207 | A1 | 10/2009 | Christ |
| 2010/0140419 | A1 | 6/2010 | Brandt et al. |
| 2010/0272540 | A1 | 10/2010 | Bucker |
| 2012/0000291 | A1 | 1/2012 | Christoph et al. |
| 2013/0039697 | A1* | 2/2013 | Plankl et al. ............ 403/349 |
| 2013/0055822 | A1* | 3/2013 | Frank ............ 73/756 |

FOREIGN PATENT DOCUMENTS

| | | |
|---|---|---|
| DE | 199 23 985 | 12/2000 |
| DE | 102 56 970 | 6/2004 |
| DE | 102005026016 | 12/2006 |
| DE | 102006056391 | 4/2008 |
| DE | 102006059034 | 8/2008 |
| DE | 102007008862 | 8/2008 |
| DE | 102008048318 | 9/2010 |
| WO | WO 00/71978 | 11/2000 |
| WO | WO 2010/031676 | 3/2010 |

OTHER PUBLICATIONS

PCT International Preliminary Report on Patentability including English Translation of PCT Written Opinion of the International Searching Authority for International Application PCT/DE2011/000417, issued Nov. 6, 2012, 7 pages, International Bureau of WIPO, Geneva, Switzerland.

German Search Report for German Application No. 10 2010 020 961.9, dated Jan. 18, 2011, 2 pages, with English translation, 2 pages, Muenchen, Germany.

* cited by examiner

METHOD AND FASTENING DEVICE FOR FASTENING AN ASSEMBLY IN AN OPENING OF A WALL OF A VEHICLE

FIELD OF THE INVENTION

The invention relates to a method and a fastening device for fastening an assembly in an opening of a wall of a vehicle.

BACKGROUND INFORMATION

Components, in particular sensors (e.g. for safety harnesses), are fastened to a vehicle in different ways in the automobile industry. Typically, fastening types such as screwing, riveting and gluing are used. Especially in case of sensors used in safety-critical applications, such as air bag systems, it is crucial that these be securely mounted. On the one hand, it must be ensured that the sensor is properly mounted when the vehicle leaves the factory. On the other, the sensor must continue to be mounted in the correct place and position or be exchangeable without compromising safety in case of repair or the like during the entire service life.

For this reason, the installation process of conventional sensors, which are e.g. screw-fastened, is documented in many cases. This can be done e.g. by monitoring and recording the torque and the angle of rotation during the screwing process.

The publication DE 199 23 985 A1 discloses a sensor assembly where the housing of an air pressure sensor used to sense side impacts is fastened to a wall in the vehicle by means of fastening means, for example screws. The door of said vehicle preferably has a dual structure comprising a dry compartment next to the interior of the vehicle, a wet compartment facing the external sheet metal covering and a separating wall in between. The air pressure sensor is arranged on said separating wall. It must sense air pressure changes in the wet compartment while its electrical components or at least the plugs and wires are arranged in the electrically safe dry compartment.

For this purpose, the separating wall has an opening through which either the air pressure is transferred to a so-called dry compartment sensor, which is arranged in the dry compartment, or the plug portion of a wet compartment sensor, which is arranged in the wet compartment, extends into the dry compartment. At the same time, the opening in the separating wall is closed by pressing the fastening element against said wall.

DE 10 2006 059 034 B3 describes a method for attaching a component to a wall, wherein an insertion tab of said component is first inserted in the wall and then a snap-in hook of the component is pressed into the opening in the wall via an inclined plane during a tilting movement towards the wall until said snap-in hook engages behind the wall. Such a method has the drawback that much pressure is applied to the insertion tab during said tilting movement and part of the sealing effect is lost when the hook engages, which means that the pressure exerted before must be so high that the seal may be partly destroyed during the tilting movement.

A generic method and a corresponding fastening device are for example known from DE 10 2008 048 318. Instead of a screwed connection, said method comprises a solution based on a bayonet mount, wherein a retaining element comprising at least one, preferably at least two, retaining wings is arranged in a support element so as to be rotatable therein, and said retaining wings can be inserted in the opening in the wall in a first rotational position, are turned about an axis of rotation that is at right angles to the wall and engage behind the wall in the second rotational position, thus fastening the support element, the retaining element and the assembly thereon to the wall. This allows for tool-free and fast, yet secure mounting. One or more support lugs on the support element can prevent said support element from turning along during rotation, and an additional locking unit can prevent the retaining element from turning back once it has reached a predefined position, for example the desired final position. The retaining wing(s) comprise(s) portions of different thickness in the radially outward direction. In conjunction with a suitably adapted inner radius of the hole geometry, the degree of pressure with which the fastening device is pressed against the wall can now be corrected according to the specific wall thickness. In case of a thick wall, a large radius of the hole geometry is selected and the radially outward, narrow portions of the retaining wing are used while the thicker inner portions extend into the inner radius of the hole geometry. In case of a thin wall, a smaller radius is selected and the thicker inner portions are used, thus achieving a thickness that compensates for the thinner wall thickness so that the degree of pressure against the wall is approximately the same. However, said portions have the same thickness along a radius. In addition, much pressure must be applied to the support element during rotation to allow the retaining means to engage behind the wall. If additional manual pressure is no longer applied, the degree of pressure against the wall will reduce.

The support element is provided with a sealing element which seals the opening in the wall in a fluid-tight manner. Such a mounting solution, however, requires rotation of the retaining element and the bayonet element relative to each other, which means that there must be a suitable play between the two elements. It is difficult to ensure that no moisture will enter said play, at least during extreme temperatures and throughout the long service life required. If there is no such play, the seal is subjected to a considerable degree of friction during rotation about the central axis of the component, abrasion may occur or the seal may even turn out of position, thus becoming leaky.

SUMMARY OF THE INVENTION

An object of one or more embodiments of the present invention is therefore to prevent moisture from entering. This object can be achieved by one or more of the inventive embodiments disclosed herein.

An idea behind one or more embodiments of the invention is to improve the generic method and the corresponding fastening device in a suitable manner. For this purpose, a sealing element is interposed between the support element and the retaining element. However, a seal filling all of the play would have the great drawback that on the one hand it would cause additional frictional resistance during rotation, thus making rotation much more difficult, and on the other the seal may be deformed or damaged on its surfaces during rotation to such an extent that fissures, abrasions, cracks or just material fatigue will result, which will cause the sealing effect to decrease or even cease—at least over the long service life span and in case of temperature variations.

According to an embodiment of the invention, the fastening device and the method are therefore designed in such a manner that a seal is provided, but there remains a play towards said seal in a first section of the path of rotation, and said play is eliminated only in the last section of the path of rotation, preferably at the end thereof, and the sealing element is sealingly compressed between the support element and the retaining element in this position. This means the first section of the path serves to fix the fastening device on the wall by engaging behind said wall, and the last section of the path serves to close the seal.

The terms "support element" and "retaining element" have been used with the same meaning as in the generic application DE 10 2008 0 48 318 A1. The support element is the part that is substantially immovable during installation on the wall, while the retaining element is the part that is turned relative to the support element during installation on the wall and whose retaining wings engage behind the wall. Rotation takes place about the central axis of the component, which axis is at right angles to the plane defined by the wall.

The support element, the retaining element and the sealing element in between are elements whose dimensions are dependent on each other. To ensure their functional effect, it is in principal possible to suitably adapt one element to the two other elements and said adaptation is sufficient to achieve the effect according to the invention, which is expressed in words by the and/or connection in the claims. This means it is also irrelevant to the invention whether the sealing element is arranged separately between the support element and the retaining element or is mechanically connected to either element, for example injection moulded thereto.

As a result, the play required for rotation in the first section can be provided between the sealing element and the support element or as an alternative between the sealing element and the retaining element, which is again expressed by the and/or connection in the claims. This means it is of no importance whether the seal turns along in the first section of the path as long as there is a play towards the opposite side, i.e. the seal turns along without friction.

In a first section of the path of rotation, there remains a play between the support element and/or the retaining element and/or the sealing element. Said play can extend both in the axial and radial direction.

At least at the end of the path of rotation, the support element and the retaining element or either of them move(s) in such a manner relative to the sealing element that said play is eliminated and the sealing element is sealingly compressed between the support element and the retaining element.

In this context, it is of no importance whether both elements move or only one element moves relative to the other, provided there is sufficient movement to eliminate the play and achieve a sealing effect by means of the seal.

In a preferred embodiment, the support element and the retaining element have edge portions that face each other and extend radially, i.e. at the same distance from the central axis. "Edge portions" means the points of contact where the support element and the retaining element are in contact during the path of rotation. This means the support element and the retaining element permanently rest on each other on the edge portion. The edge portions have a first axial distance between the support element and the retaining element in a first section of the path of rotation in the area of the sealing element, and said first axial distance exceeds the axial dimension of the sealing element so that there is a suitable play in this first path section to ensure easy rotation which in particular does not affect the sealing element.

At the end of the path of rotation, a recess extending in the axial direction is provided on at least one of the edge portions, so that the retaining element moves in the axial direction relative to the sealing element and the remaining second axial distance between the support element and the retaining element in the area of the sealing element is smaller than the axial dimension of the sealing element. This means the sealing element is primarily compressed in the axial direction although possibly the sealing element also fills and eliminates the play between the support element and the retaining element in the radial direction due to its deformation. However, the sealing effect mainly depends on the axial compression.

In a preferred embodiment, the support element is provided with a second sealing element which faces the wall and has an elasticity in the axial direction. In principle, such a sealing element is known in the state of the art. In the present embodiment, however, a special functional effect is achieved, which also requires suitable dimensions of this second sealing elements. Said second sealing element is pressed in the axial direction due to the fact that the retaining wings of the retaining element press the retaining element, the latter presses the support element and this in turn presses the second sealing element against the wall to such an extent that the second seal also seals the opening in the wall in a fluid-tight manner. However, the pressure exerted on the second sealing element is reduced due to the axial movement of the retaining element at the end of the path of rotation.

In another preferred embodiment, a second part of the path of rotation is provided before the end of said path of rotation, where the retaining wing already engages behind the wall and tightens the second sealing element axially against the wall so that the second sealing element is already tightened before the first seal closes at the end of the path of rotation due to the axial movement of the retaining element. The first part of the path of rotation preferably makes up at least half of the path of rotation.

The support element and/or the retaining element preferably comprise(s) at least one locking unit, which is designed to retain the retaining element in position once it has reached the end of the path of rotation.

In a preferred embodiment, the retaining wings increase in thickness in the radial direction in the direction of rotation towards the final fastening position; in this way, the thickness of the retaining wing serves to achieve an increase in pressure during the path of rotation, in particular to compensate at least partly for the decrease in pressure due to the axial displacement of the retaining element when it reaches the end of the path of rotation and the recess provided there.

BRIEF DESCRIPTION OF THE DRAWINGS

The invention will now be explained in more detail by means of exemplary embodiments and with reference to the figures. Each of the figures shows views of precisely one exemplary embodiment in different positions and cut in different planes in order to show the way it functions inside. However, the teaching claimed is defined by the patent claims and should not be understood to be limited to this one exemplary embodiment.

Hereinafter, functionally equivalent and/or identical elements can have the same reference numerals. In addition, an attempt has been made to structure the reference numerals in a hierarchic fashion: the first digit of a reference numeral always identifies the relevant overall element.

In the figures:

FIG. 1: shows a three-dimensional view of the fastening device including the sensor in the initial and final positions;

FIG. 2: shows a first side view, partly in section in order to show functionally relevant parts inside;

FIG. 3: shows a detailed view;

FIG. 4: shows a second side view, partly in section in order to show functionally relevant parts inside;

FIG. 5: shows a three-dimensional view of the fastening device when inserted in the wall, seen from the wet compartment.

DETAILED DESCRIPTION OF EXAMPLE EMBODIMENTS OF THE INVENTION

Figure 1A:
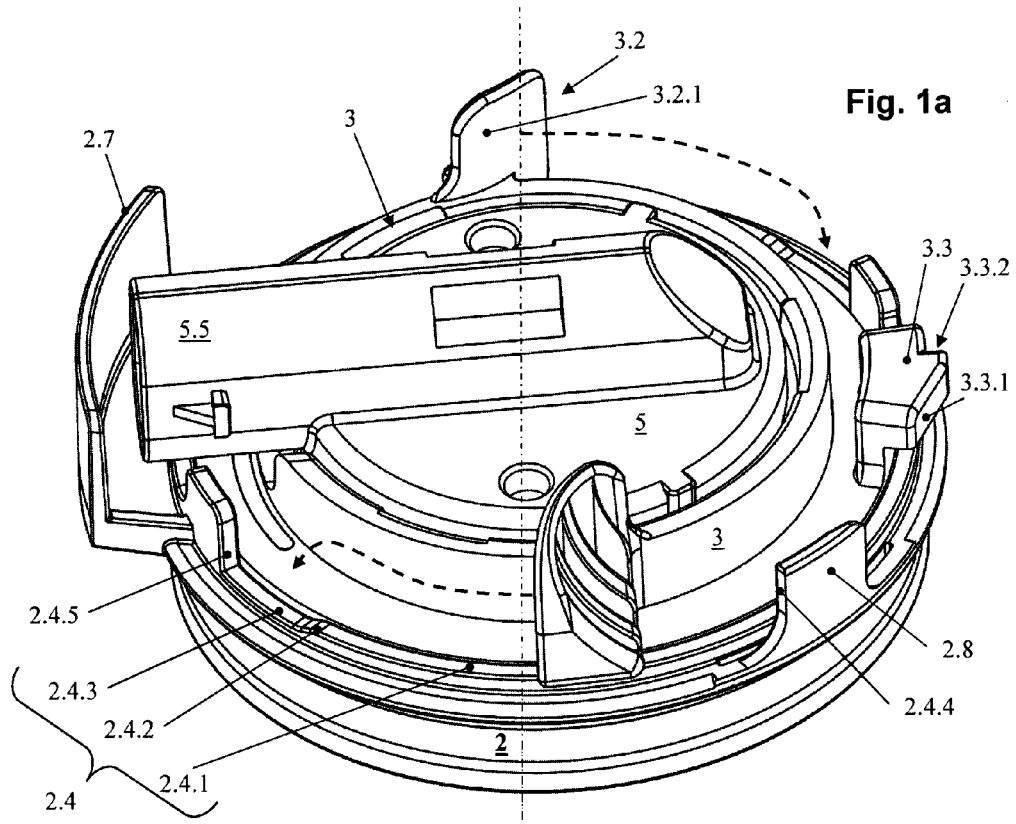
In FIGS. 1-5, figure a) always shows the initial position when the fastening device is inserted into the wall, and figure b) always shows the position when the fastening device is fastened to the wall and both the wall and the fastening device itself are fluid-tight. With this explanation in mind, the figures are largely self-explanatory if viewed in conjunction with the attached list of reference numerals. In addition, reference is expressly made to the parts and functions described partly in the generic application DE 10 2008 048 318 A1.
Figure 1B:
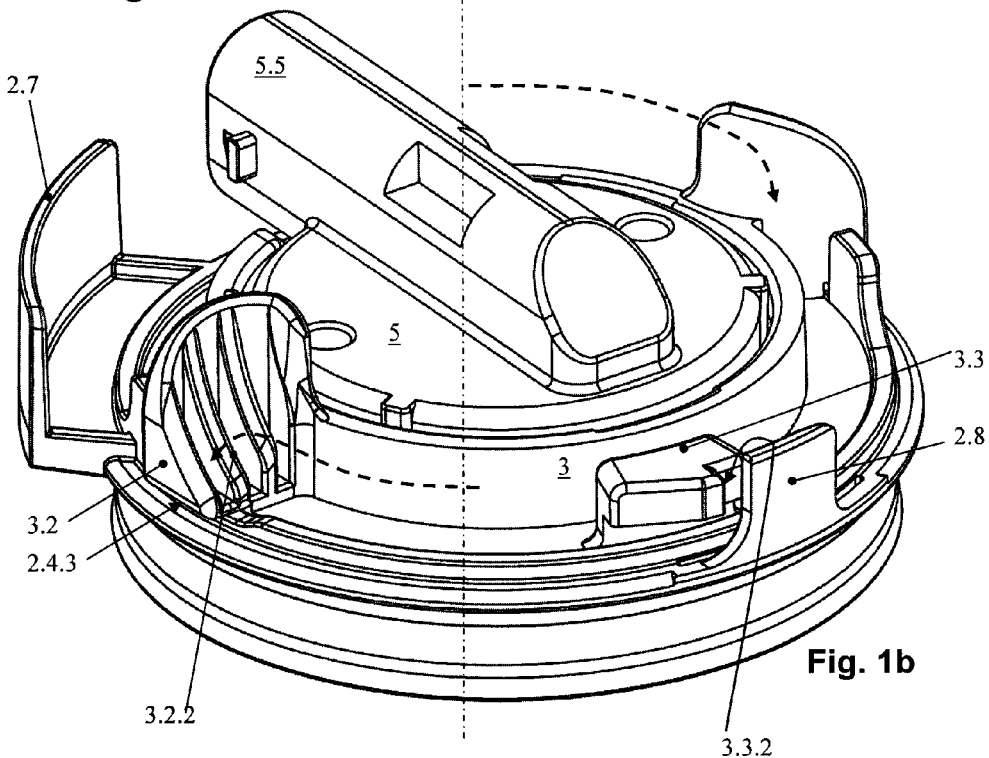

FIG. 1 shows a three-dimensional view of the fastening device, including a sensor element 5 that is inserted in the retaining element 3 and the support element 2. In the present example, the support element 2 and all sub-elements of said support element are fixed in position, i.e. they are attached to the wall with the predefined alignment, while the retaining element 3 is turned relative thereto according to the path of rotation shown until it reaches the final position. A dotted/dashed line shows the axis of rotation about which the retaining element 3 is turned in the support element 2 and, in particular at the end of the path of rotation, is also moved in the axial direction, i.e. in a direction towards said axis. The axis of rotation is at right angles to the wall and coincides with the central axis or axis of symmetry of the substantially rotationally symmetric base. As a result, the path of rotation consists of a portion of substantially rotary motion, i.e. in the tangential direction, where the retaining element 3 is turned relative to the support element 2 about the dotted/dashed central axis and a portion of substantially translational motion, i.e. in the axial direction, where the retaining element 3 penetrates deeper into the support element 2, as will be explained in more detail below.

FIG. 1 does not show the wall 1 and the openings provided therein since these would be shielded by the fastening device. FIG. 1 clearly shows the edge portion 2.4, which determines the path of rotation and the axial distance between the support element 2 and the retaining element 3 in an inner cavity that cannot be seen in FIG. 1. The edge portion 2.4 comprises a level first path section. A following path section 2.4.2 preferably comprises an inclined plane to reduce the axial distance and finally move the retaining element down into the recess 2.4.3.

In addition, the support element 2 is provided with a plug cover 2.7, which prevents contact with the electrical plug-in contact 5.5 of the sensor assembly 5 until the fastening device has been turned into its final position. Moreover, the support element 2 comprises a reverse-lock flap 2.8, which can be bent radially outwards to a predefined extent so that a reverse-lock hook 3.3, specifically the oblique, inclined side 3.3.1 thereof, can first pass over said flap, and can then snap back and provide sufficient resistance to a stop segment 3.3.2 located on the rear side of said reverse-lock hook.

FIG. 1 also shows the retaining element 3 with its preferably two retaining wings 3.2 that are offset by an angle of 180° and preferably have a finger-tip shape, thus allowing for tool-free installation. In addition, the surface of the turning wings as a whole is slightly inclined, so that during a natural rotational movement part of the force applied in the axial direction ensures that the fastening device is also pressed against the wall.

Figure 2A:
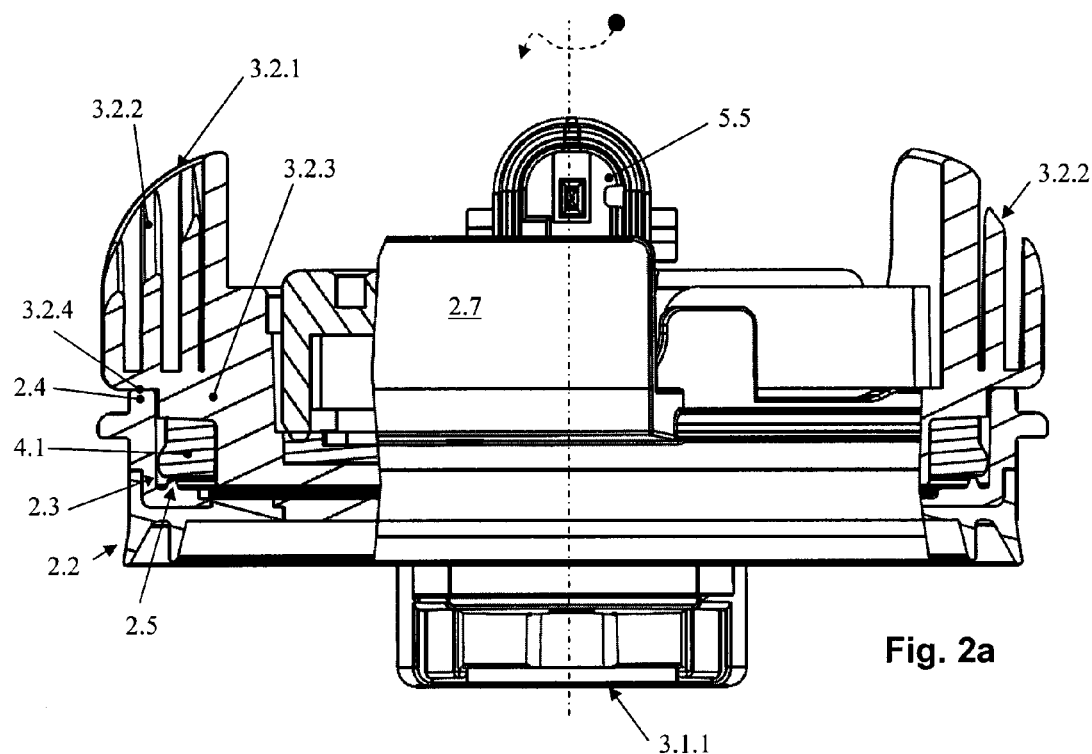
Figure 2B:
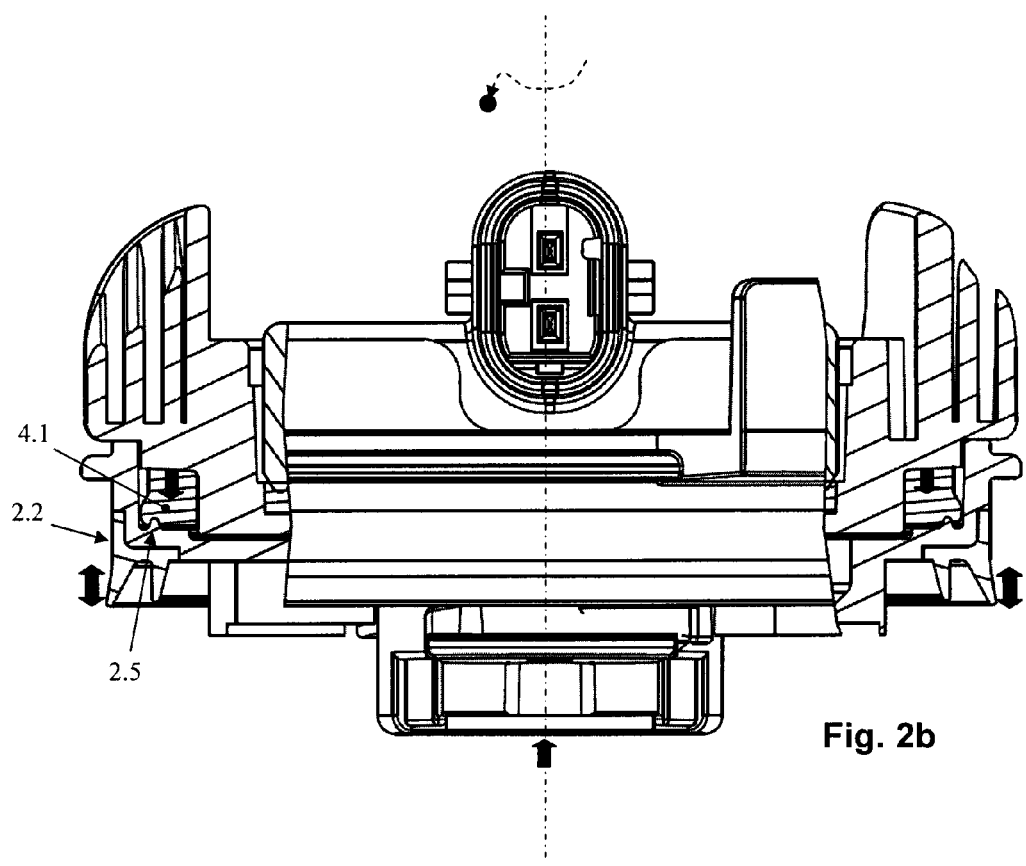

FIGS. 2a and 2b show a side view of the fastening device, partly in section in order to provide a more detailed view of the inside and the sealing element 4.1 according to the invention in the cavity 4. This, however, is shown even better in the enlarged detailed views of FIG. 3; therefore, other details will now be explained with reference to FIG. 2. FIG. 2 clearly shows the small contact surface between the edge portion 2.4 and the contacting bottom side 3.2.4 of the turning wings 3.2. This small contact surface ensures that the frictional resistance during rotation of the retaining element 3 in the support element 2 is as low as possible.

In addition, FIG. 2 clearly shows the transition from the retaining element 3 to the turning wings 3.2 formed integrally therewith, which are designed to extend from the retaining element 3 both axially upwards and radially outwards, thus forming an approximately "L"-shaped transition portion which is strong enough to transfer the rotational forces from the turning wing 3.2 to the other parts of the retaining element 3.

FIG. 3 shows a detailed view of the cavity 4 between the support element 2 and the retaining element 3, wherein said cavity 4 is formed by suitable recesses in the support element 2 and the retaining element 3 and the sealing element 4.1 is arranged in the cavity 4, wherein it is completely irrelevant to the invention whether the sealing element 4.1 is designed to be arranged separately, fastened to the support element or, as shown here, preferably injection-moulded to the retaining element 3.

Figure 3A:
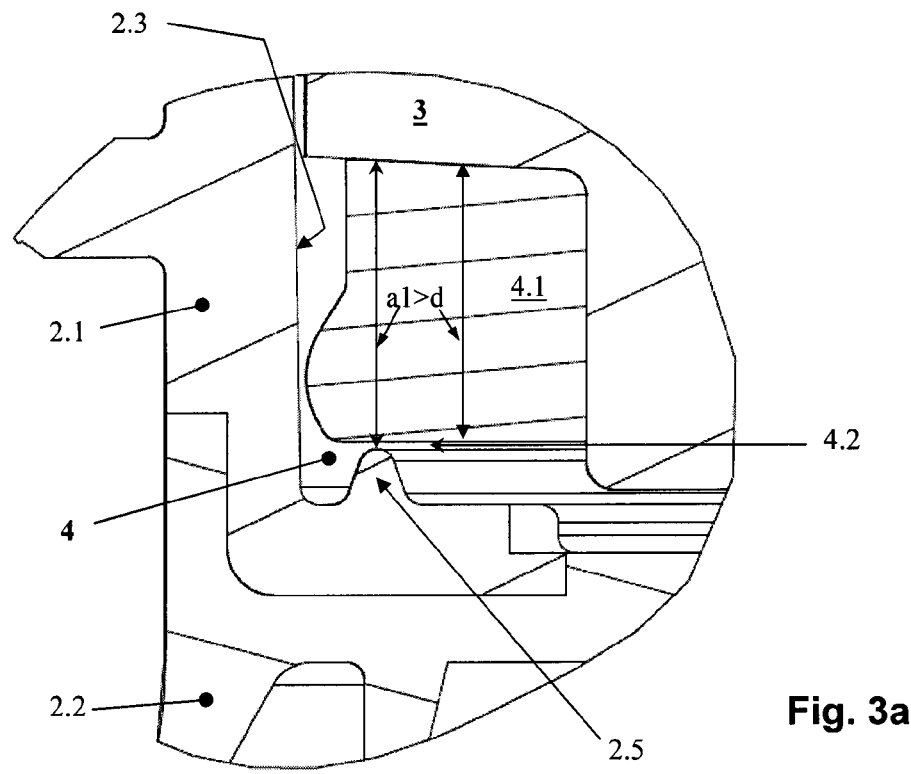

What is important and can be clearly seen in FIG. 3a) is the first axial distance a1 between the support element 2 and the retaining element 3, which exceeds the axial dimension d of the sealing element 4.1, i.e. a1>d. As a result, there is a play 4.2, which is only a few micrometers or millimeters, but sufficient to turn the retaining element 3 relative to the support element 2 without affecting or even destroying the sealing element 4.1 due to friction. In addition, this makes rotation easy in this first path section.

Figure 3B:
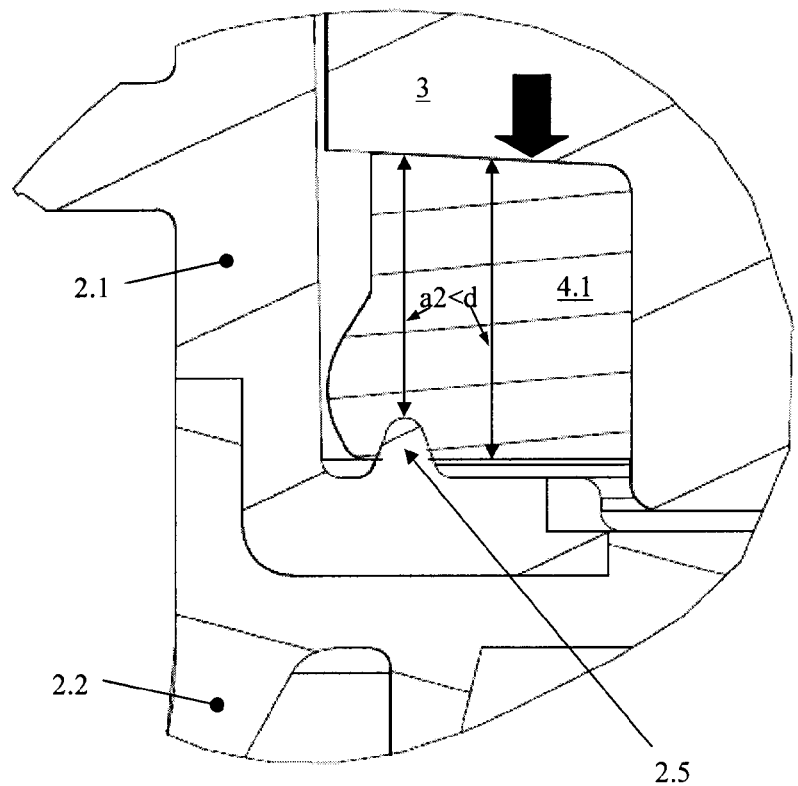

As shown in contrast in FIG. 3b), the retaining element (3) moves in the axial direction relative to the sealing element (4.1) when it reaches the final position, in such a manner that the remaining second axial distance a2 between the support element (2) and the retaining element (3) in the area of the sealing element (4.1) is smaller than the axial dimension of the sealing element (a2<d). As a result, the sealing element 4.1 is axially compressed and the cavity 4 is sealed. In the preferred embodiment shown here, the support element 2 is provided with at least one projection 2.5 extending towards the sealing element 4.1, which projection penetrates into the sealing element 4.1 in the axial direction at the end of the path of rotation. In addition or as an alternative, a projection on the retaining element 3 would also be possible. In contrast to pressure distributed over a larger surface, such an incision of a projection 2.5 into the sealing element 4.1 achieves a particularly good sealing effect and can in addition cause an inward or outward radial deformation of the sealing element 4.1, e.g. mainly outwards in the example shown, thus filling the cavity 4 even better.

It is important to understand that said axial distances a1 and a2 are caused by the edge portions 2.4 and 3.2.4 on the support element 2 and the retaining element 3 respectively, and the retaining element 3 moves axially downwards as consequence of the movement of the turning wing 3.2 into the recess 2.4.3.

Figure 4A:
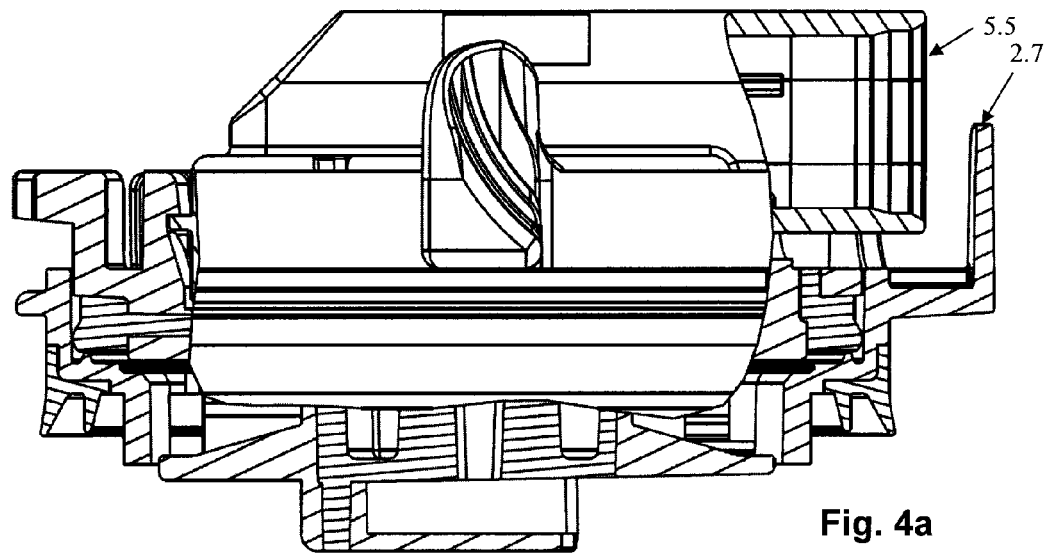
Figure 4B:
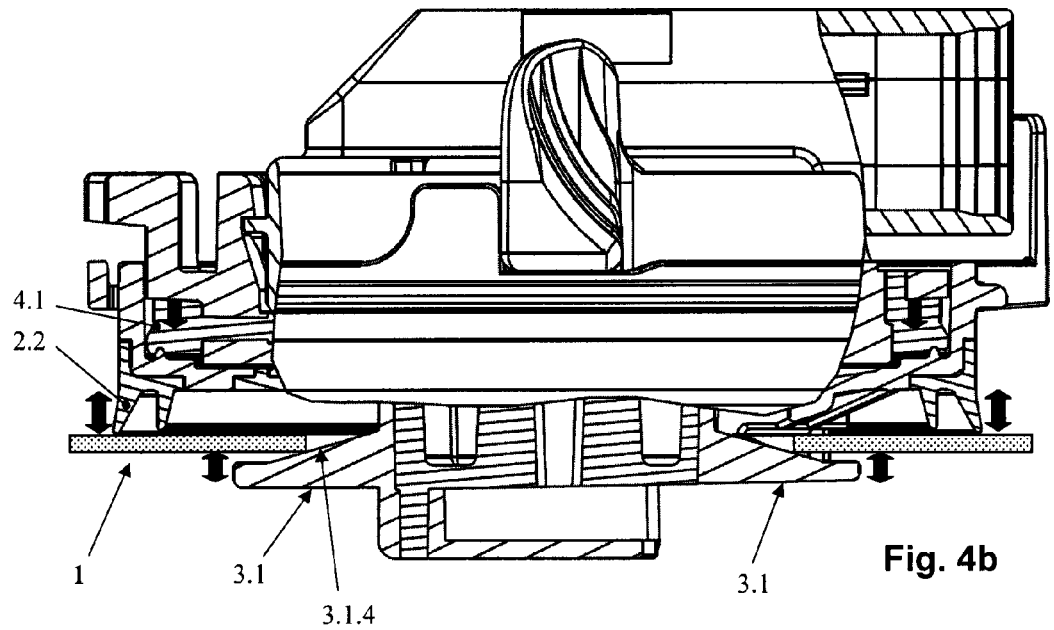

In FIG. 4, another sectional view shows a side view of the fastening device where the retaining wings 3.1 on the bottom side can be clearly seen. These retaining wings 3.1 decrease in thickness in the radially outward direction, and said thickness serves to compensate for the thickness of the wall 1 in conjunction with the different hole diameter of the inner circular opening portion 1.1.1. The general way of functioning of this fastening device including the retaining wings 3.1 has been described in sufficient detail in the generic application. The retaining wing(s) 3.1 of the retaining element engage behind the wall 1 and the retaining element 3 at least at the end of the path of rotation, thus pressing said retaining element and hence the support element 2 axially against the wall 1.

In addition, the support element 2 is provided with a second sealing element 2.2 facing the wall 1 and with elasticity in the axial direction in this exemplary embodiment.

Said second sealing element 2.2 is pressed against the wall 1 in the axial direction while slightly pressing the support element 2 away from said wall 1, as is indicated by the double arrow. However, the retaining wings 3.1 of the retaining element continue to press the retaining element 3, hence the support element 2 and hence the second sealing element 2.2 against the wall to such an extent that the second sealing element 2.2 also seals the opening 1.1 in the wall in a fluid-tight manner. At the end of the path of rotation, the pressure exerted on the second sealing element 2.2 is reduced due to the axial movement of the retaining element.

Preferably, however, the second sealing element 2.2 is already tightened axially against the wall 1 in a second part of the path of rotation before it reaches the end of the path of rotation, thus acting in a compensatory manner during this axially inward movement of the retaining element 3.

In another advantageous embodiment, the retaining wings 3.1 increase in thickness in the radial direction on their side 3.1.4 facing the wall in the direction of rotation towards the final fastening position, so that the pressure exerted in the final position increases even further, thus compensating even better for the axial displacement of the retaining element 3.

Figure 5A:
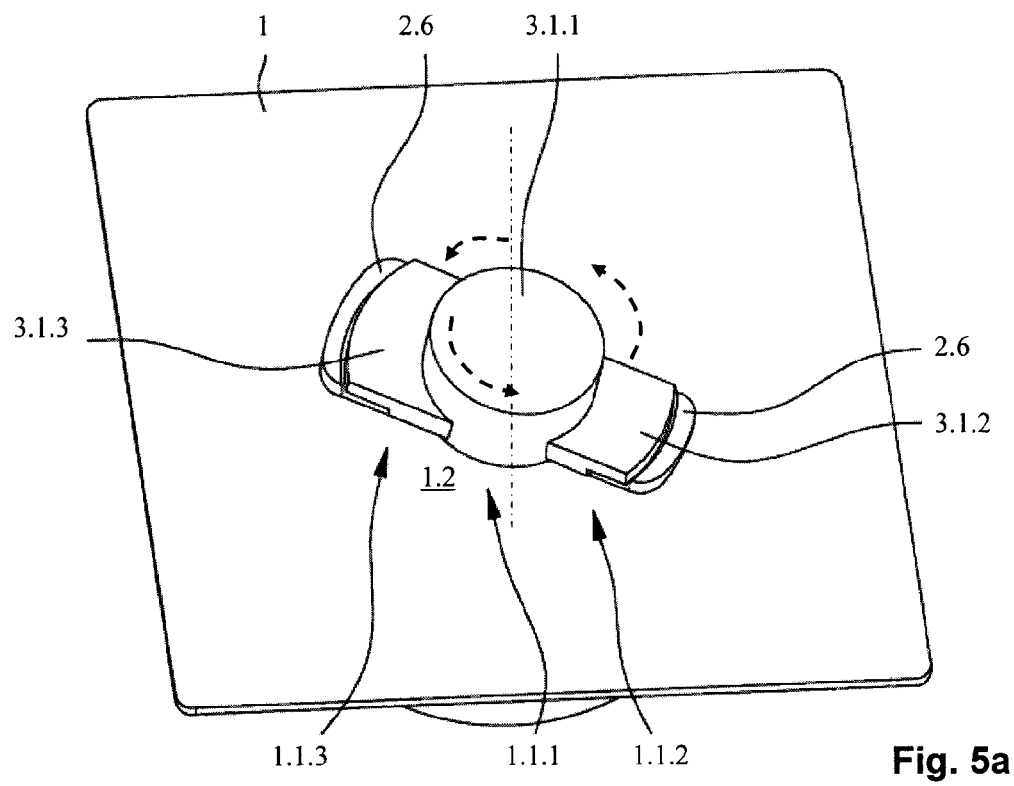
Figure 5B:
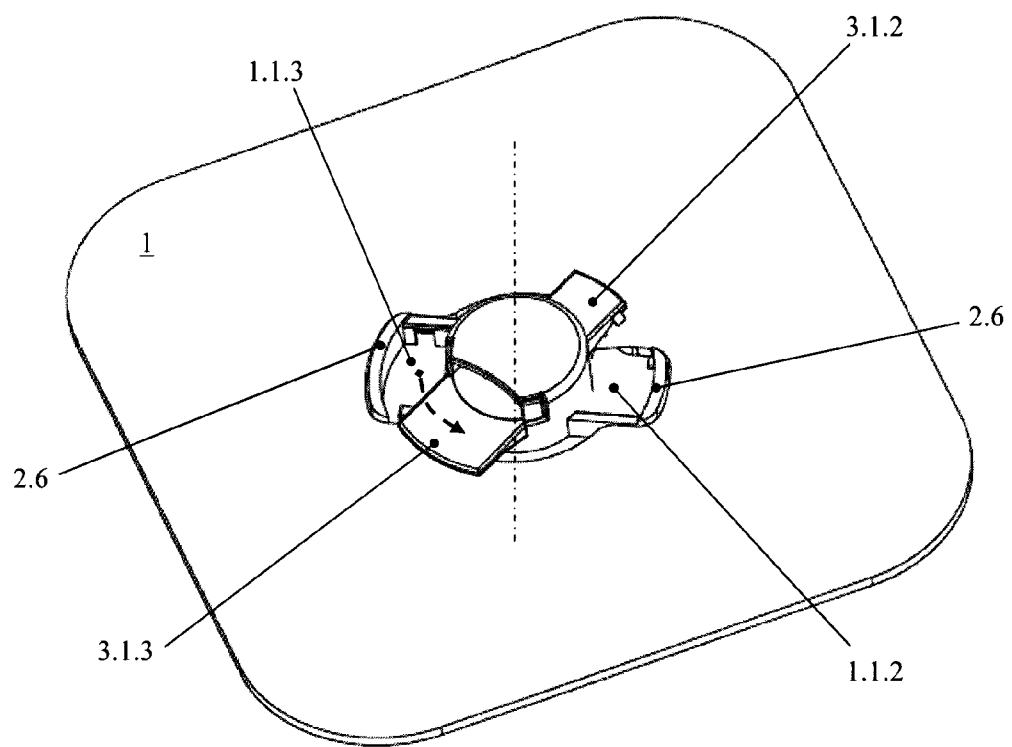

Finally, FIG. 5 shows a view of the wall 1 including the fastening device inserted in the opening 1.1, seen from the wet compartment. As can be clearly seen from FIGS. 5a and 5b, the support lugs 26 of the support element 2 ensure that the support element 2 cannot turn along during rotation of the retaining element 3; rather, only the retaining wings 3.1 are turned and engage behind the wall in the edge zone 1.2. As already explained in the generic application, the retaining wings 3.1.2 and 3.1.3 are of different width and the opening 1.1 comprises opening portions of different width 1.1.2 and 1.1.3, thus clearly defining the direction of mounting.

LIST OF REFERENCE NUMERALS

1 Wall
1.1 Opening
1.1.1 Inner circular opening portion
1.1.2 Opening portion for the narrower retaining wing
1.1.3 Opening portion for the wider retaining wing
1.2 Edge zone of the wall around the opening where the retaining wings engage behind the wall
2 Support element
2.1 Support base
2.2 Sealing element on the support element, facing the wall
2.3 Recess for sealing element and play
2.4 Edge portion on the support element
2.4.1. First path section on the edge portion
2.4.2. Second path section on the edge portion
2.4.3. Recess on the edge portion
2.4.4. Initial stop on the edge portion
2.4.5. Final stop on the edge portion
2.5 Projection on the support element towards the inner sealing element between the support element and the retaining element
2.6 Support lugs on the support element
2.7 Cover of the plug-in area
2.8 Reverse-lock flap
3 Retaining element
3.1 Retaining wing
3.1.1. Central connection area with splash protection for the channel in the sensor assembly
3.1.2. Narrower retaining wing
3.1.3. Wider retaining wing
3.1.4. Inner side of the retaining wings facing the wall
3.2 Turning wing
3.2.1. Wall of the turning wing
3.2.2. Reinforcement webs on the turning wing
3.2.3. Transition area from the turning wing to the other parts of the retaining element
3.2.4. Area of contact between the turning wing and the edge portion
3.3 Reverse-lock hook
3.3.1 Ramp segment on the reverse-lock hook
3.3.2 Stop segment on the reverse-lock hook
4 Variable cavity between the support element and the retaining element
4.1 Sealing element in the cavity
4.2 Play in the cavity until the end of the path of rotation is reached
5 Sensor assembly
5.1 Sensor element
5.2 Circuit carrier with sensor element and other components
5.3 Pressure channel
5.4 Sealing element between the pressure channel and the circuit carrier or the sensor element
5.5 Electrical plug-in contact
—.—. Axis of rotation

The invention claimed is:

1. A fastening device for fastening an assembly in an opening of a wall of a vehicle, which fastening device has the following features:
   a support element to be placed on the wall; and
   a retaining element having at least one retaining wing for fastening the fastening device in the opening of the wall, which retaining element for fastening the fastening device is arranged so as to be rotatable relative to the support element along a predetermined path of rotation, characterized in that
   a sealing element is interposed between the support element and the retaining element,
   and the support element and/or the retaining element and/or the sealing element are designed relative to one another such that
   in a first section of the path of rotation, a play remains between the support element and/or the retaining element and/or the sealing element, and
   at least at an end of the path of rotation, the support element and/or the retaining element move(s) relative to the sealing element such that the play is eliminated and the sealing element is sealingly compressed between the support element and the retaining element.

2. The fastening device according to claim 1, characterized in that
   the support element and the retaining element have edge portions extending towards each other where the support element and the retaining element are in contact with each other during the path of rotation, and
   said edge portions have a first axial distance between the support element and the retaining element in the area of the sealing element in a first section of the path of rotation and said first axial distance exceeds the axial dimension of the sealing element, and
   at the end of the path of rotation, a recess extending in the axial direction is provided on at least one of the edge portions, so that the retaining element moves in the axial direction relative to the sealing element and the remaining second axial distance between the support element and the retaining element in the area of the sealing element is smaller than the axial dimension of the sealing element.

3. The fastening device according to claim 1, characterized in that the retaining wing(s) of the retaining element engage(s) behind the wall at least at the end of the path of rotation, thus pressing the retaining element and hence the support element axially against the wall.

4. The fastening device according to claim 3, characterized in that the support element is provided with a second sealing element facing the wall and with elasticity in the axial direction, and said second sealing element is pressed in the axial direction and, at the end of the path of rotation, reduces the pressure exerted on the axial movement of the retaining element, but the retaining wings of the retaining element continue to press the retaining element, hence the support element and hence the second sealing element against the wall to such an extent that the second sealing element also seals the opening in the wall in a fluid-tight manner.

5. The fastening device according to claim 4, characterized in that there is a second part of the path of rotation before the end of said path of rotation, in which second part the retaining wing already engages behind the wall, thus tightening the second sealing element axially against the wall.

6. The fastening device according to claim 1, characterized in that the support element and/or the retaining element comprise(s) at least one locking unit which is designed to hold the retaining element in position once it has reached the end of the path of rotation.

7. The fastening device according to claim 1, characterized in that the retaining wing(s) increase(s) in thickness in the radial direction in the direction of rotation towards the final fastening position.

8. The fastening device according to claim 1, characterized in that the support element and/or the retaining element is/are provided with at least one projection extending towards the sealing element, which penetrates into said sealing element in the axial direction at the end of the path of rotation.

9. A sensor unit comprising a sensor element and a fastening device according to claim 1 connected to said sensor element.

10. A method for fastening an assembly in an opening of a wall of a vehicle by a fastening device according to claim 1, comprising inserting said at least one retaining wing through said opening of said wall, and rotating said retaining element relative to said support element.

11. The sensor unit according to claim 9, wherein said sensor element is an air pressure sensor.

* * * * *